(12) United States Patent
Alelyunas et al.

(10) Patent No.: US 6,285,709 B1
(45) Date of Patent: Sep. 4, 2001

(54) ERROR FILTERING IN A HYBRID EQUALIZER SYSTEM

(75) Inventors: Carl H. Alelyunas; Scott A. Lery; Andrew L. Norrell, all of Nevada City, CA (US); Vladimir Parizhsky, Chicago, IL (US)

(73) Assignee: 3 Com Corporation, Santa Clara, CA (US)

( * ) Notice: Subject to any disclaimer, the term of this patent is extended or adjusted under 35 U.S.C. 154(b) by 0 days.

(21) Appl. No.: 08/962,204

(22) Filed: Oct. 31, 1997

(51) Int. Cl.[7] .................................................. H03H 7/40

(52) U.S. Cl. ................................... 375/233; 708/323

(58) Field of Search ................................ 375/229, 232, 375/233, 316, 285, 348, 346, 350, 296; 364/724.19, 724.2, 724.01, 724.16; 333/28 R; 708/300, 322, 323, 319

(56) References Cited

U.S. PATENT DOCUMENTS

| | | |
|---|---|---|
| 4,074,086 | 2/1978 | Falconer et al. . |
| 4,343,041 | 8/1982 | Forney, Jr. . |
| 4,422,175 | 12/1983 | Bingham et al. . |
| 4,912,725 | 3/1990 | Hulth . |
| 4,985,902 | 1/1991 | Gurcan . |
| 5,070,514 | 12/1991 | Tjahjadi . |
| 5,168,507 | 12/1992 | Critchlow et al. . |
| 5,327,460 * | 7/1994 | Batruni ................................. 375/233 |
| 5,345,476 * | 9/1994 | Tsujimoto ............................ 375/229 |
| 5,353,307 * | 10/1994 | Lester et al. ......................... 375/232 |
| 5,491,518 | 2/1996 | Kim . |
| 5,502,507 | 3/1996 | Kim . |
| 5,513,214 | 4/1996 | Gozzo . |
| 5,517,527 * | 5/1996 | Yu ......................................... 375/233 |
| 5,528,625 | 6/1996 | Ayanoglu et al. . |
| 5,539,774 * | 7/1996 | Nobakht et al. ...................... 375/232 |
| 5,561,598 * | 10/1996 | Nowak et al. ........................ 364/148 |
| 5,636,244 | 6/1997 | Goodson et al. . |
| 5,692,011 * | 11/1997 | Nobakht et al. ..................... 375/233 |

(List continued on next page.)

FOREIGN PATENT DOCUMENTS

| | | |
|---|---|---|
| 0 580 224 A2 | 1/1994 | (EP) . |
| 0 768 779 A2 | 4/1997 | (EP) . |

OTHER PUBLICATIONS

International Preliminary Examination Report, PCT/US98/23042, Dated Nov. 24, 1999.

Primary Examiner—Chi Pham
Assistant Examiner—Emmanuel Bayard
(74) Attorney, Agent, or Firm—McDonnell Boehnen Hulbert & Berghoff

(57) ABSTRACT

Apparatus and methods of compensating for distortions introduced in communication signals received over a telephone network. An adaptive linear equalizer (LE) pre-filter is used for filtering incoming sampled communication signals received via the telephone network transmission medium. An adaptive decision feedback equalizer (DFE) is used in conjunction with the LE to provide error filtering as a hybrid equalizer system to determine which of a plurality of communication states of the sampled communication signals as an accurate estimate of the originally transmitted signals over the transmission medium, responsive to the filtered communication signals from the LE. An error signal is generated relative to the difference between the determined states of the decision mechanism of the DFE and the filtered communication signals from the LE. Further, an error filter provides a filtered output of the generated error signal, wherein the error filter has an error filter characteristic defined in accordance with the known telephone network transmission medium. The LE for the received sampled communication signals has a LE pre-filter characteristic defined in accordance with the filtered output of the error filter, using a recursive least-mean-square (LMS) technique.

20 Claims, 5 Drawing Sheets

U.S. PATENT DOCUMENTS

| | | | |
|---|---|---|---|
| 5,694,437 | * | 12/1997 | Yang et al. ............................ 375/346 |
| 5,724,397 | * | 3/1998 | Torsti ................................... 375/355 |
| 5,774,505 | * | 6/1998 | Baugh ................................... 375/348 |
| 5,777,692 | * | 7/1998 | Ghosh ................................... 375/233 |
| 5,802,118 | * | 9/1998 | Bliss et al. ............................ 375/350 |
| 5,805,637 | * | 9/1998 | Hirosaka et al. ..................... 375/230 |
| 5,880,645 | * | 3/1999 | Everitt et al. .......................... 333/18 |
| 5,930,296 | | 7/1999 | Kot . |
| 5,966,415 | * | 10/1999 | Bliss et al. ............................ 375/350 |
| 6,031,866 | * | 2/2000 | Oler et al. ............................ 375/219 |

* cited by examiner

ERROR FILTERING IN A HYBRID EQUALIZER SYSTEM

COPYRIGHT NOTICE

A portion of disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to methods and apparatus for reducing distortions in sampled communication signals received over transmission media, and more particularly relates to error filtering in a hybrid equalizer system for generating an accurate estimate of the original transmitted signal.

B. Description of the Related Art

Linear and decision feedback equalizers are commonly used in communication receivers for computer systems providing applications such as multimedia, modem communications, optical and magnetic storage devices, and wireless systems. In high-speed modem data communication systems, it is often advantageous to incorporate an adaptive decision-feedback equalizer (hereafter referred to as DFE) in conjunction with an adaptive linear equalizer (hereafter referred to as LE). For computational efficiency, the least-mean-squares (LMS) algorithm is often used as a method for adapting the coefficients of the equalizers.

LE and DFE structures have been studied in detail for their simple structures and adequate performance over well-behaved channels. The DFE has enjoyed some success as a form of equalizer for data communication receivers that attempt to eliminate intersymbol interference (ISI), due to the DFE's simplicity and its ability, unlike the LE, to perform well over channels having spectral nulls, while advantageously providing a structure without noise enhancement. However, the fundamental problem with a LE/DFE system is that, for impairments that can be mitigated by either the LE or the DFE, deep convergence of the joint system is very slow, sometimes on the order of millions of symbol periods.

Equalizers may operate in a continuously adaptive mode to track variations in the communications channel. Such continuously adaptive modes, however, typically require a significant computational burden. A method of alleviating this computational overhead in a continuous adaptive mode is to adapt the equalizer coefficients periodically based upon a known training sequence. However, channel mismatch still occurs due to problems with periodic training and the like, and an inability to be optimized for considerable channel fluctuations. Computer simulations have been found useful for predicting channel fluctuations for equalizers, but the computational requirements still may be quite significant. As described in U.S. Pat. No. 4,985,902 to Gurcan for "Decision Feedback Equalizer and a Method of Operating a Decision Feedback Equalizer," issued Jan. 15, 1991, a method attempts to optimize the peak reference tap of a DFE by optimizing the mean square error (MSE) performance of the DFE in the presence of arbitrary channel mismatch.

Gurcan makes the assumption that increasing the number of feed-forward taps improves the MSE performance. U.S. Pat. No. 5,513,214 to Gozzo for "System and Method of Estimating Equalizer Performance in the Presence of Channel Mismatch," issued Apr. 30, 1996, however, indicates that while increasing the number of feed-forward taps may improve performance under ideal conditions, such is not always the case under severe channel mismatch conditions. Gozzo observes that existing performance estimators either found the MSE by ignoring channel mismatch, or calculated the MSE using cumbersome and/or expensive analysis or simulation techniques which are not amiable to real-time applications. Therefore, Gozzo attempts to provide quick estimation of equalizer performance under arbitrary channel mismatch conditions to predict the MSE performance of the LE or DFE structure when training the equalizers, assuming a finite length non-recursive type LE. Lee, "A Fast Computation Algorithm for the Decision Feedback Equalizer" IEEE Transactions on Communications, Vol. 43, No. 11, Nov. 1995, also describes a non-recursive MSE-DFE structure for achieving faster convergence. Such non-recursive LE solutions for estimating of equalizer performance using MSE estimation still require considerable computation capabilities.

Previous solutions to the rate of convergence problem have involved, either directly or by some approximation method, collecting data to determine an autocorrelation matrix, then the inversion of the autocorrelation matrix to extract initial coefficients. In directly inverting the autocorrelation matrix, extreme precision and intense computation are required, which becomes unrealistic for LE/DFE structures of some length in a real-time application. Other methods employ one or more approximations to the matrix inversion which adversely affect initial convergence, often achieving results inferior to simple joint LMS update. It would be desirable, therefore, to provide faster convergence of the LE and DFE coefficients using a recursive adaptation algorithm.

SUMMARY OF THE INVENTION

It is an object of the present invention to work on the disadvantages of prior art equalizer systems for generating accurate estimates of sampled communication signals received over transmission media.

It is another object of the present invention to provide error filtering in a hybrid equalizer system.

It is a further object of the present invention to provide apparatus and methods of compensating for distortions introduced in sampled communication signals received over a transmission medium to obtain accurate estimates of the original transmitted signals.

A described embodiment provides for the compensation of distortions introduced in high-speed data transmission signals received over a telephone network. An adaptive linear equalizer (LE) pre-filter is used for filtering incoming sampled communication signals received through the high-speed data transmission channel. An adaptive decision feedback equalizer (DFE) is used in conjunction with the LE to provide error filtering as a hybrid equalizer system to determine which of a plurality of communication states of the sampled communication signals is an accurate estimate of the originally transmitted signals over the transmission medium. An error signal is generated relative to the difference between the determined states of the decision mechanism of the DFE and the filtered communication signals from the LE. Further, an error filter provides a filtered output of the generated error signal, wherein the error filter has an error filter characteristic defined in accordance with the known telephone network transmission medium. The LE for the received sampled communication signals has a LE pre-filter characteristic defined in accordance with the filtered output of the error filter, using a recursive least-mean-square (LMS) technique. By filtering the error appropriately to each of the LE and DFE, using LMS update or any other convergent recursive tap update algorithm, significantly faster deep convergence of the joint structure may be achieved when the spectrum of the received signal is approximately known.

Briefly summarized, the present invention relates to apparatus and methods for compensating for distortions introduced in sampled communication signals received over a transmission medium. A pre-filter is used for filtering incoming communication signals received via the transmission medium. A decision mechanism is then used to determine which of a plurality of communication states of the sampled communication signals was originally transmitted over the transmission medium, responsive to the filtered communication signals from the pre-filter. An error signal generator generates an error signal relative to the difference between the determined states of the decision mechanism and the filtered communication signals from the pre-filter. Further, an error filter provides a filtered output of the error signal generated by the error signal generator, wherein the error filter has an error filter characteristic defined in accordance with the known transmission medium. The pre-filter for the received sampled communication signals has a pre-filter characteristic that adapts in accordance with the filtered output of the error filter and the characteristics of the received sampled communication signal.

BRIEF DESCRIPTION OF THE DRAWINGS

The foregoing and other objects, features or advantages of the present invention may be more readily appreciated by reference to the disclosure when considered in conjunction with the accompanying drawings and the detailed description of the preferred embodiments described below, in which.

DETAILED DESCRIPTION OF THE PREFERRED EMBODIMENTS

Figure 1:
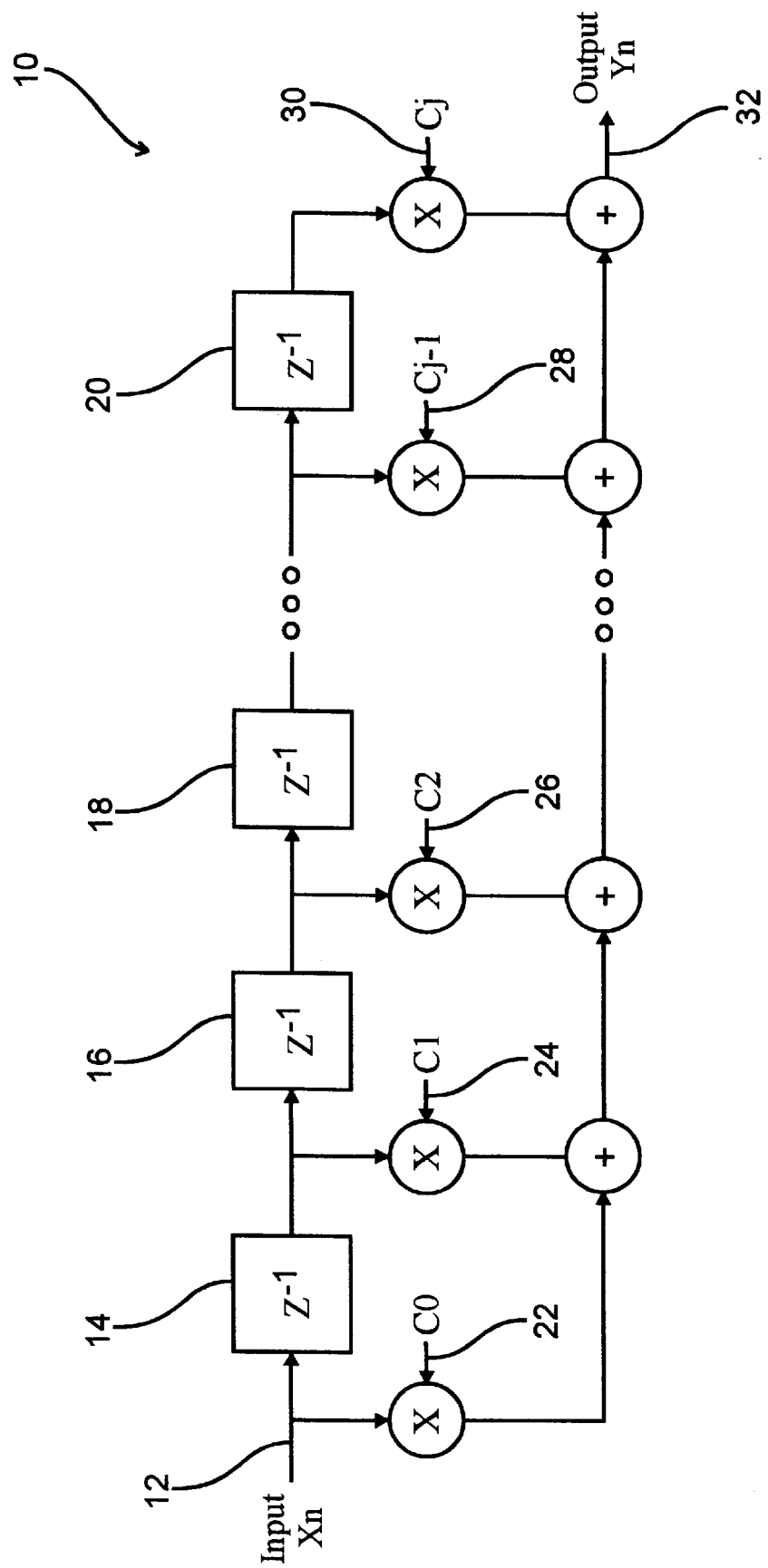
FIG. 1 illustrates a linear equalizer (LE) structure which is used to modify properties of a signal by convolving a sequence of input samples in a finite impulse response (FIR) filter structure.

With reference to FIG. 1, the LE is embodied as a filter structure used to modify properties of a signal by convolving a sequence of input samples Xn with a sequence of weights ("taps") Ck where the weights are adjusted by a criteria which generates the filter response Yn adaptively. The convolutional sum structure of the LE 10 takes an input signal 12, Xn through a series of delay elements 14, 16, 18 . . . 20, for multiplication with weighting coefficients C0 through Cj as a first plurality of tap weights 22, 24, 26 . . . 28, and 30. The sum of the input samples Xn multiplied by tap weights 22, 24, 26, and 28–30, which are summed using a series of adders provide an output signal 32, Yn. Equation (1) for the LE convolution may be written:

$$Y_n = \sum_{k=0}^{J} C_k \cdot X_{n-k} \quad (1)$$

FIG. 1 and equation (1) demonstrate a real-only implementation but it is contemplated that software may be provided in an embodiment using the complex number domain in common practice and without loss of generality. The digital signal processing for implementing the described embodiment may be carried out on conventional DSPs such as the Texas Instruments TMS320C5x Series processor. In the described embodiment, the LMS algorithm is used to adjust the weights, which will tend to minimize the mean-square error (MSE), where $err_n$=Output Yn–Decision Dn, in a recursive structure. The real variable implementation of the LMS algorithm may be written as:

$$C_{k(i-n+1)} = C_{k(i-n)} - err_n \cdot X_{(n-k)} \cdot \alpha \quad (2)$$

where $\alpha$ is a small number less than 1 which may be determined empirically, based upon the characteristics of the communication channel.

Figure 2:
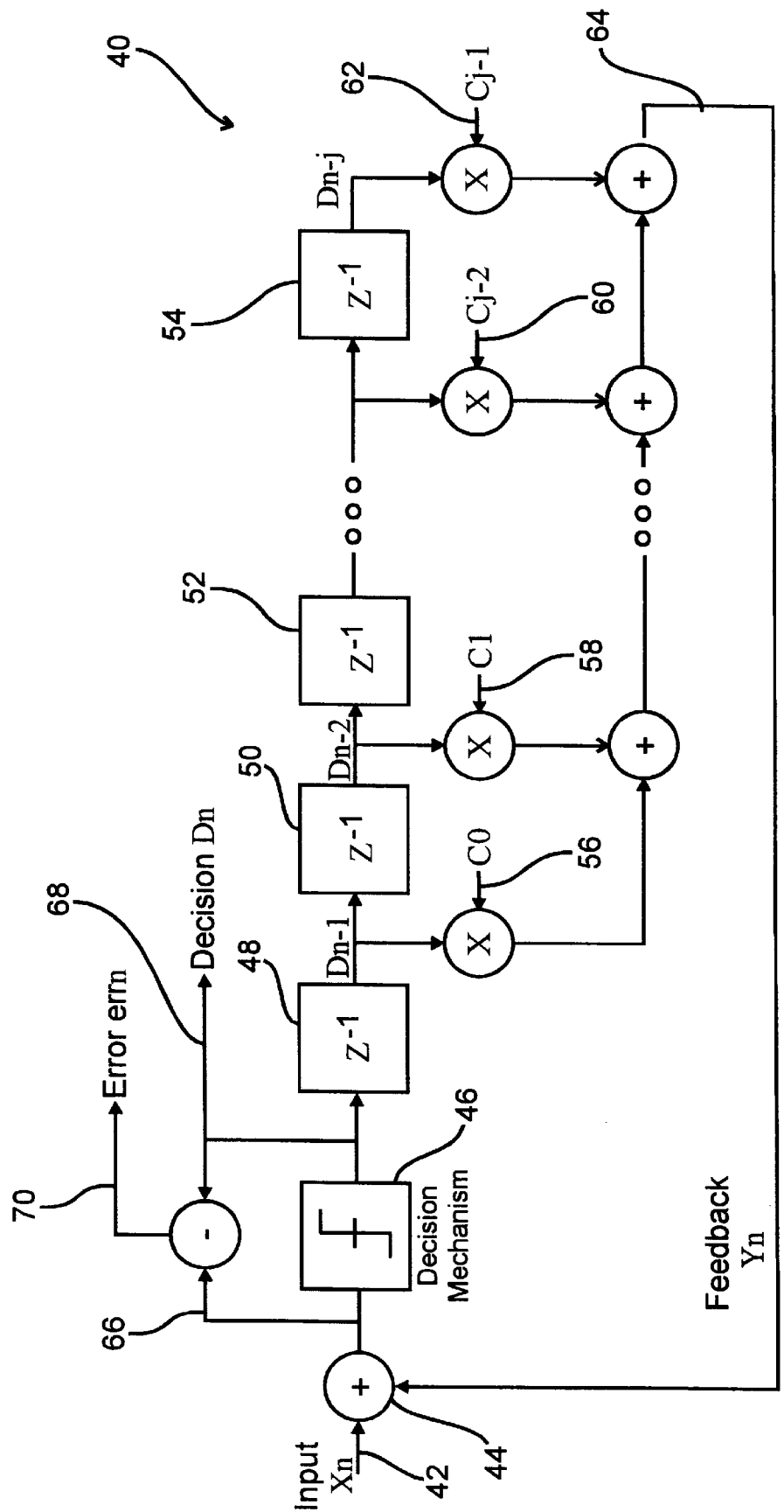
FIG. 2 illustrates the decision feedback equalizer (DFE) in which a decision mechanism and a convolutional sum generates an adaptive filter response.

FIG. 2 shows the DFE structure generally at 40 which is similar to the LE 10 in that it is a convolutional sum, having tap weights adjusted by a criteria which generates the filter response adaptively. The DFE differs from the LE in that the source for the convolution is a sequence of previously determined decisions Dn, as follows:

$$Y_n = \sum_{k=0}^{J-1} D_{n-k-1} \cdot C_k \quad (3)$$

Again, the tap weights may be adjusted by the LMS algorithm for computational efficiency.

In FIG. 2, the DFE structure 40, receiving an input signal 42, Xn, which is added to a feedback signal Yn at adder 44. The combined input and feedback signal is presented to a decision mechanism 46 or slicer for determining one of a plurality of communication states of the sampled communication signals from input 42. The decision mechanism 46 is based upon the constellation signal set of the modem, in accordance with, e.g., the recent PCM class modems, or prior technologies such as the V. 34 modems and the like. The DFE 40 uses the previously determined communication states in the convolution to provide a feedback signal. The output of the decision mechanism 46 is presented to a series of delayed elements 50 and 52 . . . 54, and much as the convolutional sum of the LE structure, delayed decisions Dn are weighted by a second plurality of tap weights 56, 58 . . . 60, and 62. The output of the convolutional sum in which coefficients C are multiplied by decisions Dn are then summed to provide an output 64, Yn, which also provides a feedback signal to the adder 44 at the input of the DFE structure, as discussed above.

The DFE structure 40 also provides for the generation of an error signal relative to the difference between the determined states of the decision mechanism and the input to the decision mechanism. Herein the difference between the input to the decision mechanism 66, and the output of the decision mechanism 68 provide an error signal 70. Thus, the signals provided by the DFE 40 are the decision signals 68 and error signals 70.

Figure 3:
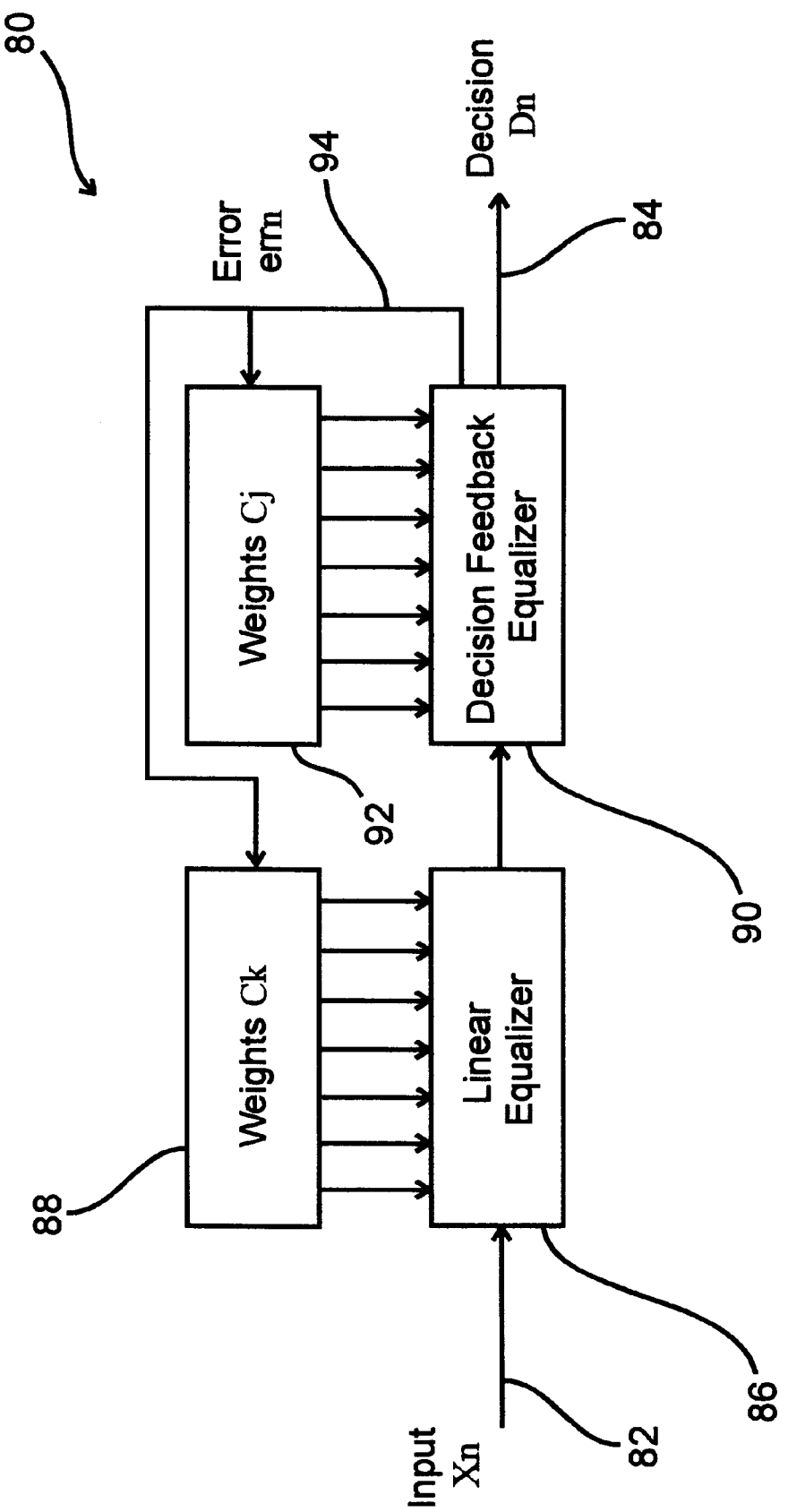
FIG. 3 is a block diagram showing a LE/DFE combined structure in which joint error from the DFE is used for updating filter tap weights.

An advantage of a DFE structure is a lack of noise enhancement, since decisions, assuming they are not in error, are noiseless. A disadvantage is that the DFE can only work on the post-cursor portion of the channel impulse. A structure used to achieve the advantages of both the DFE and LE structures is in FIG. 3, where the decision error jointly drives the convergence of both equalizers. The joint error being used for the LE/DFE weight update structure is shown generally at 80, wherein an input is provided at 82 and a decision 84 is derived from the combined LE/DFE structure. Herein, an LE 86 provides its output to a DFE 90 such that weighting coefficients Ck and Cj are provided at 88 and 92 respectively in response to an error signal 94 from the DFE 90. This structure is particularly good at equalizing channels with deep spectral nulls in the transmission band.

By filtering the error appropriately to each of the LE 86 and DFE 90, see FIG. 4 and FIG. 5 discussed below, using LMS update or any other convergent recursive tap update algorithm achieves significantly faster deep convergence of the joint structure may be achieved when the spectrum of the received signal is approximately known. In the described embodiments, the channel to be equalized is a voice-band channel with a null at DC and a partial null at 4 Khz for an 8 Khz symbol rate, based upon knowledge of the base band signals. Such spectral characteristics are found in the new class of PCM modems. The error filter characteristics are thus related to the spectral shape of the communications channels herein being related, e.g., to the voice-band channel of a digital telephone network (DTN).

Figure 4:
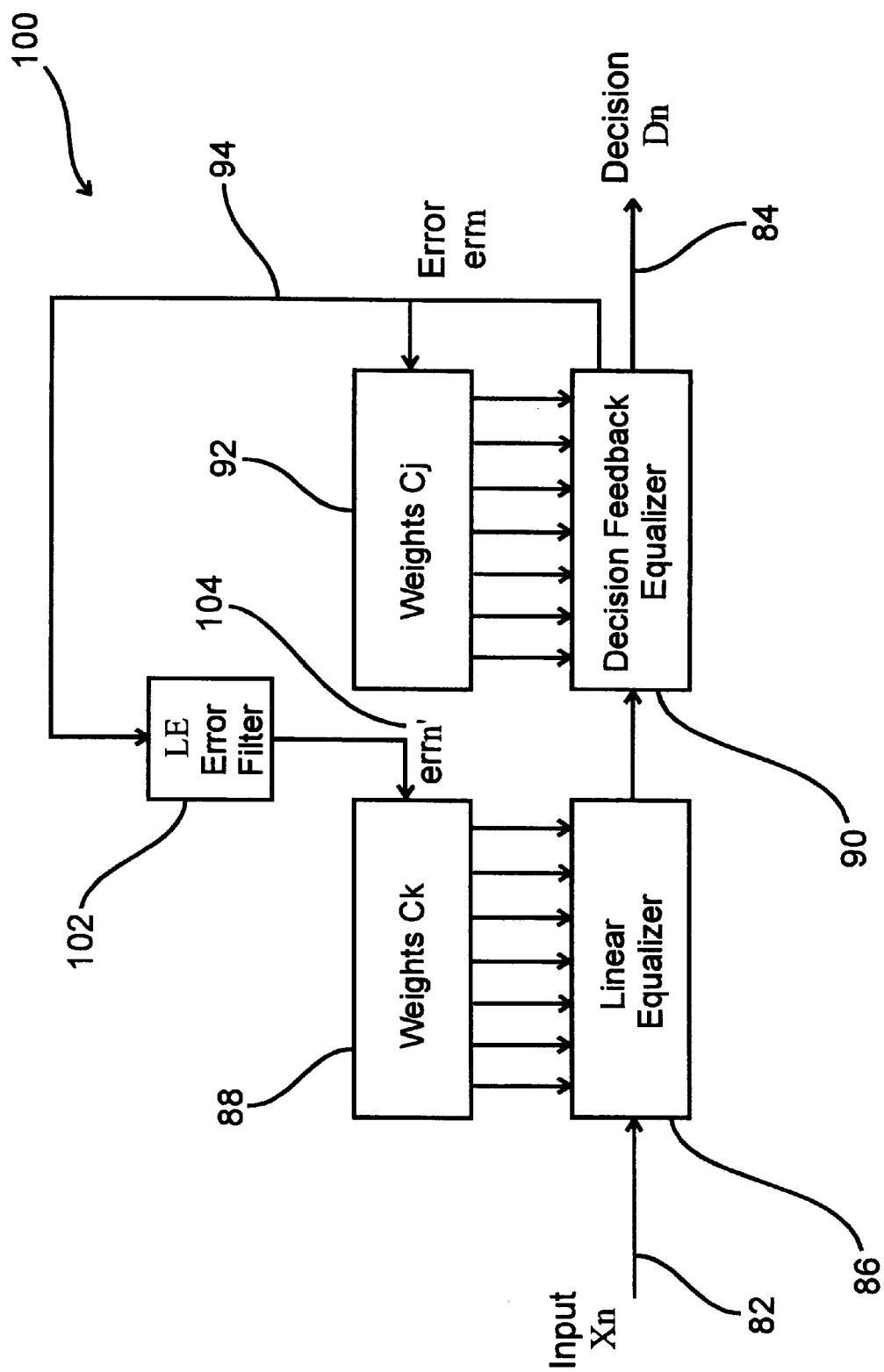
FIG. 4 shows a block diagram in which filtered joint error is used in weight update of the LE taps.

Referring to FIG. 4, a filter is applied to the error that is used to adjust the LE coefficients. The filtered joint error, i.e., the error signal 94 filtered by an LE error filter 102 provides an error signal 104 which has been filtered for use in updating tap weights Ck 88 in the LE 86 of the combined structure referenced at 100. Thus, the output of the error filter is used to adjust the first plurality of tap weights Ck 88. Advantageously, the apparatus 100 provides compensation for distortions introduced in the sampled communication signals 82 received over a known transmission medium wherein the LE 86 provides a pre-filter for filtering the sampled communication signals and the DFE 90 then determines one of a plurality of communication states of the sampled communication signals responsive to the filtered communication signals from the pre-filter, LE 86. The error signal 94 is generated relative to the difference between the determined states of the decision mechanism, e.g., decision mechanism 46, of the DFE 90 and the filtered communication signals from the signal provided from the LE 86. The LE error filter 102, herein, LE error filter 102, thus provides a filtered output of the error signal 94 of the DFE 90 which has an error filter characteristic defined in accordance with the known transmission medium. Thus, the weights Ck 88 for the LE 86 pre-filter has its pre-filter characteristic defined in accordance with the filtered output of the LE error filter 102 presented as a filtered error signal 104. In the embodiment the filter takes the form:

$$err_n' = err_n - a \cdot err_{(n-1)} - b \cdot err_{(n-2)} \quad (4)$$

where a and b are constants which add to 1, based upon a monic structure.

When this is the case the filtered error has a profound null at DC and a somewhat shallower null at 4 Khz. The error to the DFE remains unfiltered in the preferred embodiment, although a filter with another spectral shape may be applied to the DFE error for some other convergence criteria. For a LE length of 96 taps and a DFE length of 24 taps, there is a twenty-fold typical decrease in convergence time of the embodiment over a conventional implementation.

Figure 5:
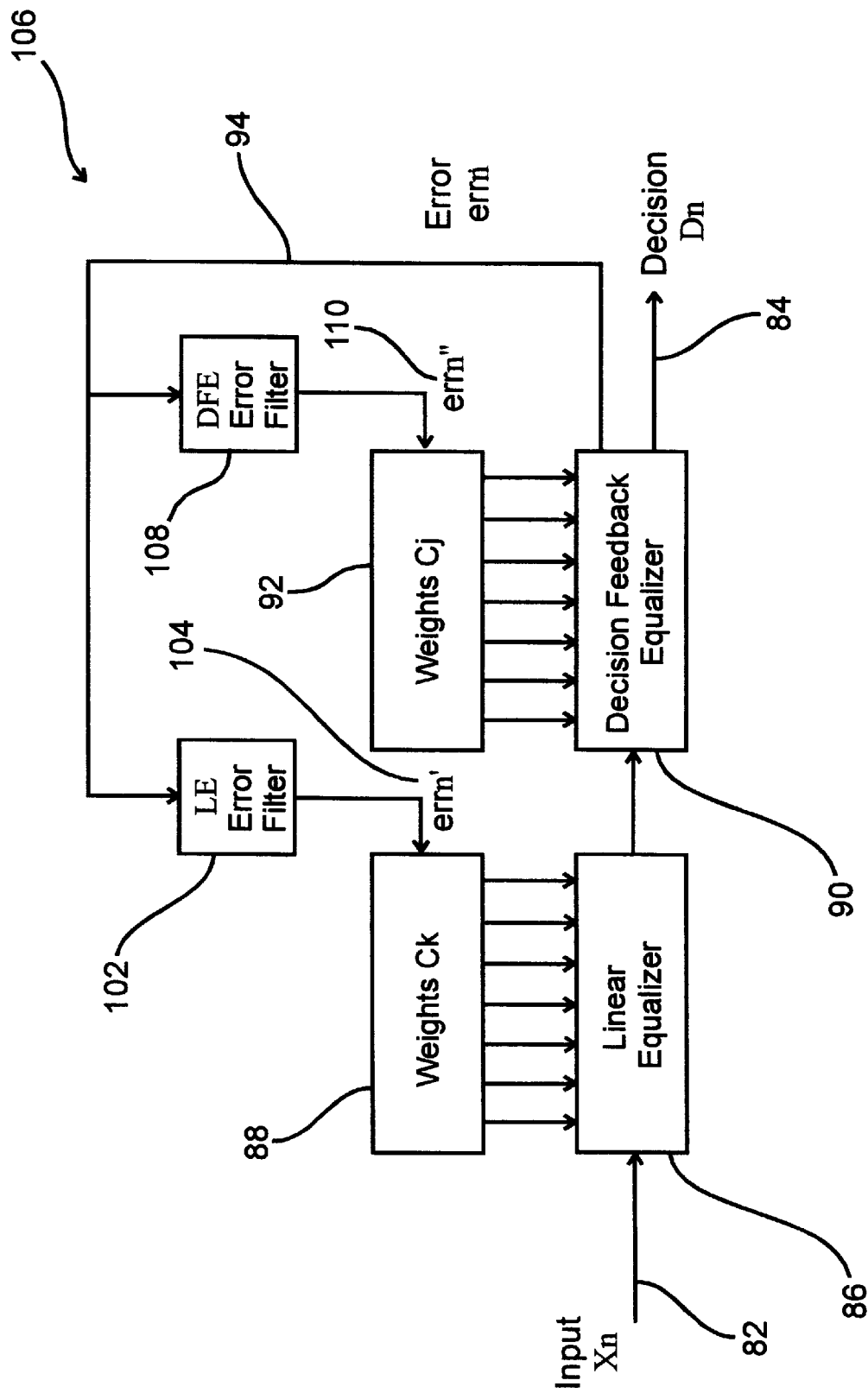
FIG. 5 shows a block diagram in which filtered joint error is used in weight update of both of the LE and the DFE taps.

With reference to FIG. 5, an alternative embodiment provides a filtered joint error used in the weight update of LE and DFE taps shown generally at 106, wherein, in addition to the previously described LE 86 and DFE 90 combined structure, error 104 filters, herein LE error 94 filter 102 and DFE 90 and 94 error filter 108 provide error signals 104 and 110 respectively to update the respective tap weights for the LE 86 and DFE 90 and 94. The outputs of separate LE and DFE 90 and 94 error filters, 102 and 108 are used to adjust respective first and second plural tap weights, Ck 88 and Cj 92.

The preferred embodiments for error filtering in a hybrid equalizer system having been described, and, more particularly, the compensation of distortions introduced in sampled communication signals received over known transmission media will make numerous changes and modifications apparent to those skilled in the art that may be made to the described embodiments without departing from the true spirit and scope of the invention. Thus, it is intended that the present invention be defined by the appended claims.

What is claimed is:

1. An apparatus for compensating for distortions introduced in sampled communication signals received over a known transmission medium, comprising:

a pre-filter for filtering the sampled communication signals;

a decision mechanism for determining one of a plurality of communication states of the sampled communication signals responsive to the filtered communication signals from said pre-filter;

an error signal generator for generating an error signal relative to the difference between the determined states of said decision mechanism and the filtered communication signals from said pre-filter;

an error filter providing a filtered output of the error signal generated by said error signal generator, said error filter having an error filter characteristic defined in accordance with the known transmission medium; and said pre-filter having a pre-filter characteristic defined in accordance with the filtered output of said error filter.

2. An apparatus as recited in claim 1 wherein said pre-filter comprises a linear equalizer (LE) comprising a convolutional sum of the sampled communication signal with a first plurality of tap weights.

3. An apparatus as recited in claim 1 wherein said decision mechanism comprises a decision feedback equalizer (DFE) comprising a convolutional sum of multiple previously determined communication states with a second plurality of tap weights.

4. An apparatus as recited in claim 2 wherein said first plurality of tap weights is adjusted according to a recursive tap update algorithm.

5. An apparatus as recited in claim 4 wherein said recursive tap update algorithm adjusts said first plurality of tap weights according to a least-mean-squares (LMS) algorithm.

6. An apparatus as recited in claim 3 wherein said second plurality of tap weights is adjusted according to a recursive tap update algorithm.

7. An apparatus as recited in claim 6 wherein said recursive tap update algorithm adjusts said second plurality of tap weights according to a least-mean-squares (LMS) algorithm.

8. An apparatus as recited in claim 5 wherein the output of said error filter is used to adjust said first plurality of tap weights.

9. An apparatus as recited in claim 7 wherein said error signal is used to adjust said second plurality of tap weights.

10. An apparatus as recited in claim 7 wherein the output of said error filter is used to address said second plurality of tap weights.

11. An apparatus as recited in claim 8 wherein the output of said error filter is used to adjust said second plurality of tap weights.

12. An apparatus as recited in claim 1 wherein the error filter characteristic is related to the spectral shape of a communications channel carried over the known transmission medium.

13. An apparatus as recited in claim 1 wherein the error filter characteristic is related to a voice-band channel carried over a telephone network.

14. An apparatus as recited in claim 12 wherein the error filter characteristic comprises a voice-band channel with spectral nulls in the channel pass-band at DC and 4 kHz.

15. A method of compensating for distortions introduced in sample communication signals received over a transmission medium, comprising the steps of:

pre-filtering the sampled communication signals;

determining one of a plurality of communication states of the sampled communication signals in response to the pre-filtered communication signals;

generating an error signal relative to the difference between the determined states of said determining step and the pre-filtered communication signals;

identifying a characteristic spectral shape of the transmission medium and providing a filtered output of the error generated by said generating step, the filtered output having an error filter characteristic defined in accordance with the identified characteristic spectral shape of the transmission medium; and said pre-filtering step having a pre-filter characteristic defined in accordance with the filtered output of the error signal.

16. A method as recited in claim 15 wherein said pre-filtering step comprises a linear equalizer (LE) comprising a convolutional summing step for the sampled communication signals with a first plurality of tap weights.

17. A method as recited in claim 16 wherein said determining step comprises a decision feedback equalizer (DFE) comprising a convolutional summing step for multiple previously determined communication states with a second plurality of tap weights.

18. A method as recited in claim 17 wherein the filtered output of the error signal is used to adjust said first plurality of tap weights.

19. A method as recited in claim 18 wherein the filtered output of the error signal is used to adjust said second plurality of tap weights.

20. An apparatus for compensating for distortions introduced in sampled communication signals received over a transmission medium, comprising:

means for pre-filtering the sampled communication signals;

means for determining one of a plurality of communication states of the sampled communication signals in response to the pre-filtered communication signal;

means for generating an error signal relative to the difference between the determined states of said determining means and the pre-filtered communication signal;

means for identifying the characteristic spectral shape of the transmission system medium and providing a filtered output of the error signal generated by said generating means, the filtered output having an error filter characteristic defined in accordance with the identified characteristic spectral shape of the transmission medium; and said pre-filtering means having a pre-filtered characteristic defined in accordance with the filtered output of the error signal.

* * * * *